United States Patent
Kawakatsu et al.

(10) Patent No.: US 10,443,023 B2
(45) Date of Patent: Oct. 15, 2019

(54) ALKALINE CLEANING LIQUID COMPRISING UREA AND/OR BIURET, AND CLEANING METHOD FOR REVERSE OSMOSIS MEMBRANE

(71) Applicant: KURITA WATER INDUSTRIES LTD., Tokyo (JP)

(72) Inventors: Takahiro Kawakatsu, Tokyo (JP); Kazuki Ishii, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 14 days.

(21) Appl. No.: 15/509,683

(22) PCT Filed: Oct. 1, 2015

(86) PCT No.: PCT/JP2015/077901
§ 371 (c)(1),
(2) Date: Mar. 8, 2017

(87) PCT Pub. No.: WO2016/056453
PCT Pub. Date: Apr. 14, 2016

(65) Prior Publication Data
US 2017/0275571 A1 Sep. 28, 2017

(30) Foreign Application Priority Data
Oct. 6, 2014 (JP) .................................. 2014-205704

(51) Int. Cl.
| | | |
|---|---|---|
| *C11D 7/32* | (2006.01) | |
| *B01D 65/06* | (2006.01) | |
| *B01D 71/56* | (2006.01) | |
| *C11D 17/08* | (2006.01) | |
| *B01D 65/02* | (2006.01) | |
| *B01D 61/02* | (2006.01) | |

(52) U.S. Cl.
CPC ............ *C11D 7/3272* (2013.01); *B01D 65/02* (2013.01); *B01D 65/06* (2013.01); *B01D 71/56* (2013.01); *C11D 7/32* (2013.01); *C11D 17/08* (2013.01); *B01D 61/025* (2013.01); *B01D 2321/162* (2013.01); *B01D 2321/164* (2013.01); *B01D 2321/168* (2013.01)

(58) Field of Classification Search
CPC .................................................... C11D 3/3917
See application file for complete search history.

(56) References Cited

U.S. PATENT DOCUMENTS

| | | | | |
|---|---|---|---|---|
| 4,157,348 A * | 6/1979 | Ono | ...................... | C07C 273/04 564/241 |
| 6,075,022 A | 6/2000 | Zollinger et al. | | |
| 2007/0289924 A1* | 12/2007 | Siegel | .................. | B01D 61/025 210/636 |
| 2012/0121728 A1* | 5/2012 | Antebi | .................... | A01N 47/28 424/661 |
| 2012/0301685 A1* | 11/2012 | Iseki | ....................... | C09B 43/16 428/195.1 |
| 2013/0101683 A1* | 4/2013 | Tu | ........................... | B01D 65/02 424/665 |
| 2013/0324664 A1 | 12/2013 | Kawakatsu et al. | | |
| 2014/0124442 A1 | 5/2014 | Nakamura et al. | | |
| 2014/0274854 A1* | 9/2014 | Ortmann | .............. | C11D 3/0094 510/195 |
| 2015/0045276 A1* | 2/2015 | Aoki | ...................... | B01D 65/02 510/162 |
| 2015/0056679 A1* | 2/2015 | Patten | .................... | B01D 65/02 435/184 |
| 2016/0271565 A1 | 9/2016 | Liu et al. | | |

FOREIGN PATENT DOCUMENTS

| | | |
|---|---|---|
| CN | 103143262 A | 6/2013 |
| JP | H08-132093 A | 5/1996 |
| JP | H11-512719 A | 11/1999 |
| JP | 2002-035112 A | 2/2002 |
| JP | 2009-078218 A | 4/2009 |
| JP | 2011-208138 A | 10/2011 |
| JP | 2012-187469 A | 10/2012 |

(Continued)

OTHER PUBLICATIONS

"Maku-Shori Gijyutsu Taikei (Jyou-kan)," Outline of Membrane Separation Technology, 1991, p. 836, vol. 1, Fuji Techno System.
Europe Patent Office, "Search Report or European Patent Application No. 15848642.3," dated May 9, 2018.
Taiwan Patent Office, "Office Action for Taiwanese Patent Application No. 104132746," dated Nov. 29, 2018.
PCT/ISA/210, "International Search Report for International Application No. PCT/JP2015/077901," dated Nov. 10, 2015.
Japanese Office Action, JP Application No. 2014-205704 dated Nov. 4, 2015.

*Primary Examiner* — Charles I Boyer
(74) *Attorney, Agent, or Firm* — Manabu Kanesaka

(57) ABSTRACT

Provided are a cleaning agent and a cleaning liquid that prevent a reduction in the rejection rate of an RO membrane which may occur when the RO membrane is cleaned and a method for cleaning an RO membrane with the cleaning liquid. The agent for cleaning an RO membrane includes a urea derivative. The urea derivative preferably includes urea ($H_2N$—CO—$NH_2$) and/or biuret ($H_2N$—CO—NH—CO—$NH_2$). The cleaning liquid is an aqueous solution produced by diluting the cleaning agent. The method for cleaning an RO membrane uses the cleaning liquid. Urea and biuret have a structure analogous to amide bonds included in aromatic polyamide RO membranes, and have a strong affinity for amide bond portions. Urea and biuret adsorb onto the amide bond portions, and prevent the amide bonds from being broken by the cleaning liquid.

5 Claims, 7 Drawing Sheets

(56) References Cited

FOREIGN PATENT DOCUMENTS

| | | |
|---|---|---|
| JP | 2012-196614 A | 10/2012 |
| JP | 2012-529496 A | 11/2012 |
| JP | 2013-215678 A | 10/2013 |
| JP | 5339921 B2 | 11/2013 |
| WO | 2013/005787 A1 | 1/2013 |
| WO | 2013/120515 A1 | 8/2013 |
| WO | 2015/073170 A1 | 5/2015 |

* cited by examiner

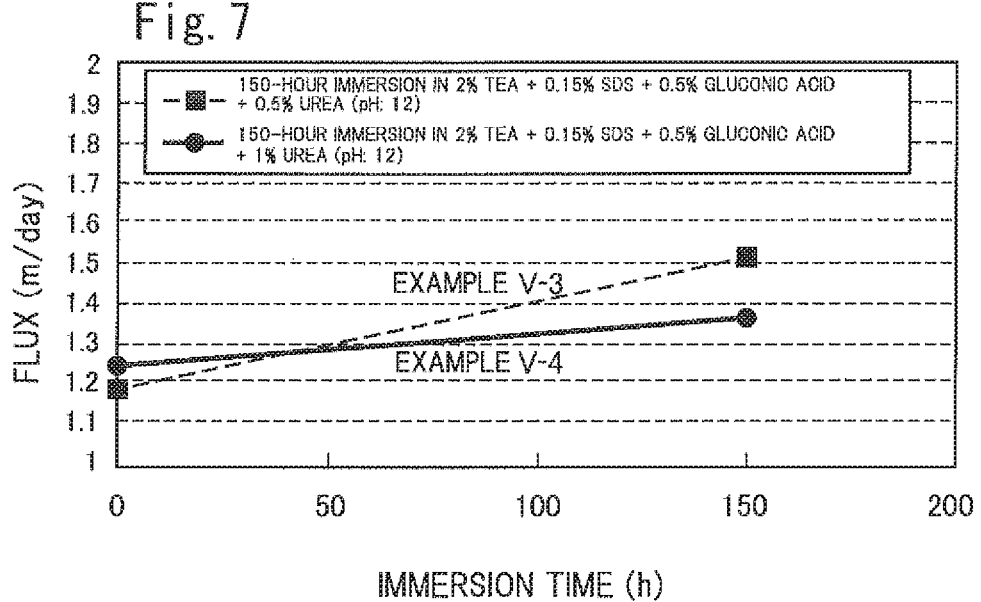

ALKALINE CLEANING LIQUID COMPRISING UREA AND/OR BIURET, AND CLEANING METHOD FOR REVERSE OSMOSIS MEMBRANE

FIELD OF INVENTION

The present invention relates to a cleaning agent and a cleaning liquid that are used for recovering the properties of reverse osmosis (RO) membrane, which is used in the field of water treatment, when the properties of the RO membrane, such as the amount of permeate and salt rejection rate, are degraded as a result of the RO membrane being fouled with organic substances and inorganic substances. The cleaning agent and the cleaning liquid according to the present invention prevent a reduction in the rejection rate of the membrane which may occur when the membrane is cleaned. The present invention also relates to a method for cleaning an RO membrane with the cleaning liquid.

BACKGROUND OF INVENTION

Separation-purification process using an RO membrane system, which consumes less energy than systems that use evaporation or electrodialysis, has been widely used for desalination of seawater or salt water, production of industrial water or ultrapure water, recovery of wastewater, and the like.

Since the fouling of an RO membrane degrades the properties of the RO membrane, RO membranes are periodically cleaned in order to recover the properties of the RO membranes. The development of a cleaning agent and a cleaning process that are further effective for cleaning RO membranes has been anticipated.

For cleaning an RO membrane, for example, acids (e.g., oxalic acid and citric acid), alkalis (e.g., sodium hydroxide), surfactants (e.g., sodium dodecyl sulfate and sodium dodecylbenzenesulfonate), chelating agents (e.g., EDTA), combined chlorine agents, and oxidizing agents, have been used depending on the properties of a foulant that fouls the membrane (Non-patent Literature 1).

The materials of RO membranes recently used are broadly classified into aromatic polyamides and cellulose acetates. Aromatic polyamide RO membranes, which have low resistance to oxidizing agents but high resistance to alkalis, can be cleaned even under an alkaline condition where the pH is 10 or more. In contrast, cellulose acetate RO membranes, which have higher resistance to oxidizing agents (e.g., chlorine) than aromatic polyamide RO membranes but low resistance to alkalis, cannot be cleaned under an alkaline condition where the pH is 9 or more.

Patent Literature 1 proposes a microbiocide for water systems such as paper-making system, the microbiocide including free chlorine, urea, and an alkali. It is not described in Patent Literature 1 that the microbiocide may be used as an agent for cleaning membranes. It is also not described in Patent Literature 1 that urea may prevent RO membranes from being degraded by cleaning agents.

Patent Literature 2 proposes an agent for preventing biofouling which includes a urea derivative that stabilizes halogens. Although it is described in Patent Literature 2 that the antifouling agent may be used for membranes, in Patent Literature 2, urea is used for stabilizing halogens and it is not described that urea may prevent RO membranes from being degraded by cleaning agents.
Patent Literature 1: Japanese Patent No. 5339921
Patent Literature 2: JP 2012-529496 A Non-patent Literature 1: "Maku-Shori Gijyutsu Taikei (Jyou-kan)" ("Outline of Membrane Separation Technology (Vol. 1)" published by Fuji Techno System) p. 836 (1991)

SUMMARY OF INVENTION

While cleaning agents are used for recovering the permeability of RO membranes, cleaning RO membranes may degrade the rejection property of the RO membranes. For example, when an aromatic polyamide RO membrane is cleaned with a cleaning liquid having a high pH, the higher the pH of the cleaning liquid, the higher the cleaning effect but the higher the risk of a reduction in the rejection rate of the RO membrane.

Although there have been reported studies of the components of a cleaning agent which enhance the effect of cleaning RO membranes as described in Non-patent Literature 1, the components of a cleaning agent that prevents a reduction in the rejection rate of an RO membrane which may occur when the RO membrane is cleaned, that is, that protects the RO membrane, have not been studied.

Accordingly, an object of the present invention is to provide a cleaning agent and a cleaning liquid that prevent a reduction in the rejection rate of an RO membrane which may occur when the RO membrane is cleaned and a method for cleaning an RO membrane with the cleaning liquid.

The inventor of the present invention studied the phenomenon in which the rejection property of an RO membrane is degraded when the RO membrane is cleaned and, as a result, found the following facts.

(1) Cleaning an RO membrane reduces the salt rejection rate and the silica rejection rate of the RO membrane and, in particular, the percentage at which the RO membrane rejects IPA (isopropyl alcohol), which is a neutral solute.

(2) A cleaning liquid that reduces the above rejection rates is under an alkaline condition where the pH is 10 or more. The higher the pH, the larger the impacts. Combined chlorine agent and oxidizing agents also reduce the above rejection rates.

The inventor of the present invention also found that adding a urea derivative, such as urea or biuret, to the cleaning agent prevents a reduction in the rejection rate of an RO membrane which may occur when the RO membrane is cleaned.

The summary of the present invention is as follows.

Advantageous Effects of Invention

[1] An agent for cleaning a reverse osmosis membrane, the agent comprising a urea derivative.

[2] The agent for cleaning a reverse osmosis membrane according to [1], wherein the urea derivative is urea and/or biuret.

[3] The agent for cleaning a reverse osmosis membrane according to [1] or [2], the agent further comprising at least one selected from the group consisting of an alkaline agent, a combined chlorine agent, and an oxidizing agent.

[4] A liquid for cleaning a reverse osmosis membrane, wherein the liquid is an aqueous solution produced by diluting the cleaning agent according to any one of [1] to [3].

[5] A liquid for cleaning a reverse osmosis membrane, the liquid comprising a urea derivative and at least one selected from the group consisting of an alkaline agent, a combined chlorine agent, and an oxidizing agent.

[6] The liquid for cleaning a reverse osmosis membrane according to [4] or [5], wherein the liquid has a pH of 10 to 14.

[7] A method for cleaning a reverse osmosis membrane, the method comprising bringing a reverse osmosis membrane into contact with the cleaning liquid according to any one of [4] to [6].

[8] The method for cleaning a reverse osmosis membrane according to [7], wherein the reverse osmosis membrane is an aromatic polyamide reverse osmosis membrane.

According to the present invention, it is possible to prevent the degradation of the rejection property of an RO membrane which may occur due to a high-alkaline condition, a combined chlorine agent, an oxidizing agent, and the like when the RO membrane is cleaned. This makes it possible to employ a cleaning method that is likely to degrade the rejection property of an RO membrane but achieves a large cleaning effect and clean the RO membrane with further effect.

BRIEF DESCRIPTION OF DRAWINGS

FIG. 7 is a graph illustrating the results of the measurement of flux conducted in Examples V-3 and V-4.

DESCRIPTION OF EMBODIMENTS

Figure 1:
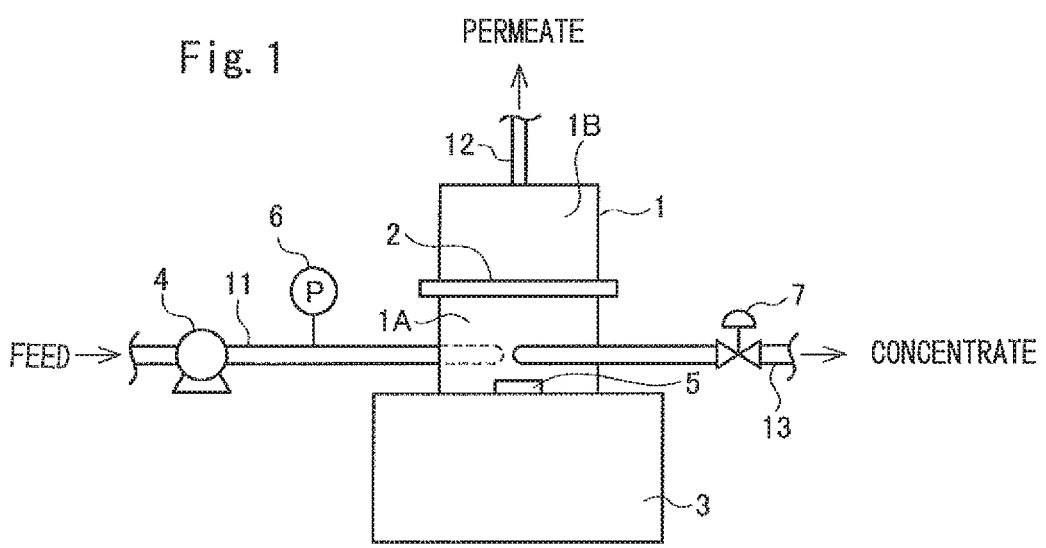
FIG. 1 is a system diagram illustrating a testing apparatus used in Tests I to IV.

Embodiments of the present invention are described below in detail.

[Mechanism of Action]

The mechanism of action according to the present invention is as follows.

Urea derivatives, such as urea ($H_2N$—CO—$NH_2$) and biuret ($H_2N$—CO—NH—CO—$NH_2$), adsorb onto an RO membrane and protect the membrane from a cleaning liquid. In particular, urea and biuret have a structure analogous to amide bonds included in aromatic polyamide RO membranes and a strong affinity for amide bond portions. Urea and biuret are therefore considered to adsorb onto the amide bond portions of aromatic polyamide RO membranes, and prevent the amide bonds from being broken by a cleaning liquid.

Urea and biuret, which are low-molecular compounds, are removed when flushing is done with the cleaning liquid and do not remain adsorbed on the amide bond portions.

[RO Membrane]

The RO membrane that is to be cleaned in the present invention may be an aromatic polyamide RO membrane or a cellulose acetate RO membrane. The present invention is effective for the cleaning of aromatic polyamide RO membranes in consideration of the action of a urea derivative adsorbing onto the amide bond portions of aromatic polyamide RO membranes.

[Cleaning Agent]

The cleaning agent according to the present invention includes a urea derivative. The cleaning agent according to the present invention is normally prepared by dissolving, in water, the urea derivative and optional components such as an alkaline agent, a combined chlorine agent, and other chemicals.

The term "cleaning agent" used herein refers to an agent that is prepared for the distribution and storage of the products and contains chemicals at concentrations higher than those required when the chemicals are used for cleaning membranes. The term "cleaning liquid" used herein refers to a liquid prepared by diluting the cleaning agent with water to the chemical concentrations at which membranes are cleaned with the chemicals.

<Urea Derivative>

The urea derivative included in the cleaning agent according to the present invention is preferably a low-molecular compound having a molecular weight of about 300 or less in order to eliminate the risk of the urea derivative remaining after flushing. Examples of the urea derivative include compounds represented by General Formula (I) below. Specific examples thereof include urea ($H_2N$—CO—$NH_2$), biuret ($H_2N$—CO—NH—CO—$NH_2$), polyurea, semicarbazide, allantoin, citrulline, thiourea, thiosemicarbazide, and thiourea derivatives.

$$(R^1)(R^2)N\text{—}C(O)\text{—}N(R^3)(R^4) \qquad (I)$$

(In General Formula (I), $R^2$, $R^3$, and $R^4$ each independently represent a hydrogen atom, an alkyl group, an aryl group, or an amideacyl group including —$R^5CONH_2$ (where $R^5$ is a single bond or an alkylene group).)

The above urea derivatives may be used alone or in a mixture of two or more.

Among the above urea derivatives, urea and biuret are particularly preferable in consideration of the RO-membrane protection effect, solubility, and availability.

<Other Components>

The cleaning agent according to the present invention may optionally include, in addition to the urea derivative, an alkaline agent, a combined chlorine agent, an oxidizing agent, other chemicals, a solvent other than water, and the like which are required for cleaning RO membranes.

Examples of the alkaline agent included in the cleaning agent according to the present invention include hydroxides of alkali metals, such as sodium hydroxide and potassium hydroxide.

Examples of the combined chlorine agent include chloramine compounds.

The chloramine compounds are preferably produced by mixing any of a compound including a primary amino group, ammonia, and an ammonium salt (hereinafter, these compounds are referred to as "$NH_2$ compounds") with hypochlorous acid and/or a hypochlorite. Examples of the compound including a primary amino group include aliphatic amines, aromatic amines, sulfamic acid, sulfanilic acid, sulfamoylbenzoic acid, and amino acid. Examples of the ammonium salt include ammonium chloride and ammonium sulfate. The above compounds may be used alone or in a mixture of two or more. Among the above $NH_2$ compounds, sulfamic acid ($NH_2SO_2OH$) is preferable. Monochlorosulfamine prepared from sulfamic acid is a stable chloramine compound. Sulfamic acid, which does not include carbon, does not increase the TOC of the cleaning agent. It is possible to produce a markedly effective cleaning agent by using sulfamic acid in combination with the alkaline agent.

Examples of the hypochlorite reacted with the $NH_2$ compound include alkali-metal salts of hypochlorous acid, such as sodium hypochlorite, and alkaline-earth-metal salts of hypochlorous acid, such as calcium hypochlorite. The above hypochlorites may be used alone or in a mixture of two or more.

When the chloramine compound is produced by mixing the $NH_2$ compound with hypochlorous acid and/or the hypochlorite, it is preferable to use the $NH_2$ compound and hypochlorous acid and/or the hypochlorite such that the molar ratio between available chlorine ($Cl_2$) originating from hypochlorous acid and/or the hypochlorite and nitrogen atom N originating from the $NH_2$ compound, that is, $Cl_2/N$ molar ratio, is 0.1 to 1 in consideration of the efficiency and consistency of the production of chloramine.

If the $Cl_2/N$ molar ratio is larger than the upper limit, free chlorine may be produced. If the $Cl_2/N$ molar ratio is smaller than the lower limit, the efficiency of the production of chloramine may be low compared with the amount of $NH_2$ compound used.

The amount of hypochlorous acid and/or the hypochlorite is equal to the amount of chloramine compound included in the cleaning agent.

Examples of the oxidizing agent include hydrogen peroxide; peracetic acid; percarbonic acid; oxoacids of halogens, such as hypochlorous acid; salts of these acids (e.g., alkali-metal salts and alkaline-earth-metal salts); peroxides; and halogens such as chlorine, bromine, and iodide. The above oxidizing agents may be used alone or in combination of two or more.

Examples of the solvent include alcohols such as ethanol; polyols such as ethylene glycol, propylene glycol, and butanediol; amines such as monoethanolamine, diethanolamine, and triethanolamine; ketones such as acetone; and ethers such as dimethyl ether, diethyl ether, and diethylene glycol monomethyl ether.

Examples of the other chemicals include a surfactant and a dispersant. Examples of the surfactant include anionic surfactants such as alkylbenzene sulfonates (e.g., sodium dodecylbenzenesulfonate) and alkyl sulfates (e.g., sodium dodecyl sulfate) and nonionic surfactants such as polyalkylene glycol monoalkyl ethers (e.g., diethylene glycol monomethyl ether).

Among the above surfactants, in particular, anionic surfactants are preferable in consideration of dispersion effect.

Examples of the dispersant include ethylenediamine tetraacetate (EDTA), glycol ether diamine tetraacetate (EGTA), polyphosphoric acid, phosphonobutanetricarboxylic acid (PBTC), phosphonic acid, polymaleic acid, citric acid, oxalic acid, gluconic acid, and the salts of the above acids.

The above dispersants may be used alone or in combination of two or more.

The cleaning agent may be a one-part cleaning agent prepared by mixing the urea derivative with the alkaline agent, the combined chlorine agent, the oxidizing agent, the other chemicals, the solvent, and the like. The cleaning agent may also be a two-part cleaning agent, that is, some of the above components may be separately provided in the form of a second part of the agent. Alternatively, the cleaning agent may be constituted by three or more parts.

The cleaning liquid according to the present invention, which is prepared by diluting the cleaning agent according to the present invention with water, may also be constituted by one part, two parts, or three or more parts. In the case where the cleaning liquid is constituted by two parts or three or more parts, for example, an RO membrane is cleaned with a cleaning liquid including the urea derivative and subsequently with another cleaning liquid including other chemicals such as an acid.

The concentration of each chemical in the cleaning agent according to the present invention is controlled to be about 5 to 100 times by weight the concentration of the chemical in the cleaning liquid according to the present invention such that the preferable concentration of the chemical in the cleaning liquid, which is described below, is achieved by diluting the cleaning agent with water, which is preferably pure water, about 5 to 100 times by weight.

[Cleaning Liquid]

The cleaning liquid according to the present invention is an aqueous solution prepared by diluting the above-described cleaning agent according to the present invention with water. The cleaning liquid according to the present invention may also be prepared by diluting the cleaning agent according to the present invention with water and optionally adding the alkaline agent, the combined chlorine agent, the oxidizing agent, the other chemicals, the solvent, and the like to the diluted cleaning agent at the predetermined concentrations.

The cleaning liquid according to the present invention is not necessarily prepared from the cleaning agent according to the present invention and may be directly prepared such that the predetermined chemical concentrations are achieved.

The concentration of the urea derivative in the cleaning liquid according to the present invention varies with, for example, the pH of the cleaning liquid and the concentrations of the other cleaning chemicals and is preferably about 0.01% to 10% by weight. If the concentration of the urea derivative is lower than the lower limit, it is not possible to sufficiently protect an RO-membrane by using the urea derivative and the rejection rate may be reduced when the membrane is cleaned. If the concentration of the urea derivative is higher than the upper limit, the cleaning effect may be reduced. Furthermore, the nitrogen content in the waste cleaning liquid may unnecessarily increased.

The pH of the cleaning liquid according to the present invention is preferably 10 to 14 in consideration of the cleaning effect.

If the pH of the cleaning liquid is less than 10, the permeability of a membrane may fail to be sufficiently recovered when the membrane is cleaned. The higher the pH of the cleaning liquid, the larger the cleaning effect. However, if the pH of the cleaning liquid is excessively high, ease of handling of the cleaning liquid is reduced and the risk of the degradation of the RO membrane is increased. The pH of the cleaning liquid is preferably 14 or less and is more preferably 11 or more and 13 or less.

The pH of the cleaning liquid according to the present invention is controlled to be the above preferable pH by the addition of the alkaline agent.

In the case where the cleaning liquid according to the present invention includes the combined chlorine agent, which is preferably the chloramine compound, the concentration of the chloramine compound in the cleaning liquid according to the present invention is preferably 0.0001 to 0.5 M and is particularly preferably 0.001 to 0.05 M. If the concentration of the chloramine compound in the cleaning liquid is excessively low, a sufficient cleaning effect may fail to be achieved. If the concentration of the chloramine compound is excessively high, RO membranes may be degraded. A chloramine compound concentration of 0.0001 to 0.5 M is equivalent to a total chlorine concentration of 7.1 to 35,500 mg-$Cl_2$/L. The total chlorine concentration can be measured by the DPD method defined in, for example, JIS K0400-33-10.1999.

In the case where the cleaning liquid according to the present invention includes the oxidizing agent, the concentration of the oxidizing agent in the cleaning liquid according to the present invention is preferably 0.000001% to 10% by weight and is particularly preferably 0.00001% to 1% by weight. If the concentration of the oxidizing agent in the cleaning liquid is excessively low, a sufficient cleaning effect may fail to be achieved. If the concentration of the oxidizing agent in the cleaning liquid is excessively high, RO membranes may be degraded.

In the case where the cleaning liquid according to the present invention includes the surfactant, the concentration of the surfactant in the cleaning liquid according to the present invention is preferably 0.005% to 2% by weight and is particularly preferably 0.02% to 0.5% by weight. If the concentration of the surfactant is excessively low, a sufficient dispersion effect of the surfactant may fail to be achieved. In addition, the cleaning action may fail to be sufficiently enhanced by using the surfactant. If the concentration of the surfactant is excessively high, the degree of association of surfactant molecules is increased. This may reduce the cleaning effect.

In the case where the cleaning liquid according to the present invention includes the dispersant, the concentration of the dispersant in the cleaning liquid according to the present invention is preferably 0.01% to 5% by weight and is particularly preferably 0.1% to 2% by weight. If the concentration of the dispersant is excessively low, the dispersion effect of the dispersant may fail to be achieved to a sufficient degree. If the concentration of the dispersant is excessively high, the cleaning effect is small compared with the concentration of the dispersant.

<Method for Producing Cleaning Agent and Cleaning Liquid>

The cleaning agent according to the present invention is prepared by mixing the urea derivative and the optional components such as the alkaline agent, the combined chlorine agent, the oxidizing agent, the other chemicals, and the solvent with water.

In the case where a cleaning agent including the chloramine compound is prepared, an $NH_2$ compound such as sulfamic acid is dissolved in an aqueous solution of an alkaline agent and hypochlorous acid and/or the hypochlorite is added to and mixed with the resulting aqueous solution of the $NH_2$ compound. The proportion of the amount of water in the aqueous solution of an alkaline agent is preferably 50% to 90% by weight.

In the case where a cleaning agent including the surfactant is prepared, the surfactant may be used in any of the steps for preparing the cleaning agent. That is, the surfactant may be added to the aqueous solution of an alkaline agent. Alternatively, the surfactant may be added to the aqueous solution of the $NH_2$ compound together with hypochlorous acid and/or the hypochlorite or prior or subsequent to the addition of hypochlorous acid and/or the hypochlorite. It is preferable to add the surfactant to the aqueous solution of the $NH_2$ compound subsequent to the addition of hypochlorous acid and/or the hypochlorite.

The compound including a primary amino group, such as sulfamic acid, may be used in the form of a salt. Examples of the salt include sodium sulfamate, potassium sulfamate, and ammonium sulfamate, which are soluble in the cleaning liquid according to the present invention.

The $NH_2$ compound is used such that the concentration of the chloramine compound in the cleaning liquid according to the present invention, which is prepared by diluting the cleaning agent according to the present invention, is the above concentration. It is preferable to determine the amount of $NH_2$ compound used such that the ratio between the amount of alkaline agent and the amount of $NH_2$ compound, that is, N/alkali metal (molar ratio), is 0.5 to 0.7. The $NH_2$ compound is used in the form of a powder or an aqueous solution. In the case where a sulfamic acid salt is used as an $NH_2$ compound, the amount of alkali metal included in the sulfamic acid salt is included in the calculation of the amount of alkali. In the case where an aqueous solution is used, the amount of water included in the aqueous solution is included in the calculation of the amount of water included in the aqueous alkaline solution.

Hypochlorous acid and/or the hypochlorite is preferably used in the form of an aqueous solution in which the concentration of available chlorine ($Cl_2$) is 5% to 20% by weight and is preferably 10% to 15% by weight. Hypochlorous acid and/or the hypochlorite is used such that the concentration of the chloramine compound in the cleaning liquid according to the present invention, which is prepared by diluting the cleaning agent according to the present invention, is the above concentration and the ratio between the amount of $NH_2$ compound and the amount of hypochlorous acid and/or the hypochlorite is the above $Cl_2$/N molar ratio. This makes it possible to efficiently produce the cleaning agent according to the present invention which includes aqueous solution agents, has high reactivity and high stability, and is easy to handle and free of chlorine smell without foaming or generation of chlorine smell. It is preferable to gradually mix hypochlorous acid and/or the hypochlorite with the aqueous solution of the $NH_2$ compound.

The cleaning liquid according to the present invention is produced by diluting the cleaning agent according to the present invention which is produced in the above-described manner, with water, which is preferably pure water, and optionally adding the alkaline agent, the combined chlorine agent, the oxidizing agent, the other chemicals, the solvent, and the like to the diluted cleaning agent. The cleaning liquid according to the present invention is not necessarily produced from the cleaning agent according to the present invention and may be directly produced by the above-described method.

<Cleaning Method>

For cleaning an RO membrane with the cleaning liquid according to the present invention, any method in which the cleaning liquid is brought into contact with the RO membrane may be employed. One of the common methods is immersion cleaning, in which the cleaning liquid is introduced into a raw-water-side portion of an RO-membrane module and the RO-membrane module is subsequently left to stand.

In the case where the cleaning agent and the cleaning liquid according to the present invention are constituted by two parts or three or more parts, the parts may be mixed together before used for cleaning.

Alternatively, the parts may be each separately used and cleaning may be performed in multiple stages with the respective parts. For example, after cleaning has been performed with a cleaning liquid including the urea derivative, another cleaning is performed with a cleaning liquid including an acid and/or another cleaning agent.

Cleaning using another cleaning liquid may be performed prior or subsequent to the cleaning using the cleaning liquid according to the present invention. For example, Cleaning using an aqueous alkaline solution or an aqueous acidic solution may be performed prior or subsequent to the cleaning using the cleaning liquid according to the present invention. The cleaning using another cleaning liquid is commonly performed also by the immersion cleaning method as described above.

An example of cleaning using a cleaning liquid other than the cleaning liquid according to the present invention is cleaning using an aqueous alkaline solution that does not contain the urea derivative which is performed subsequent to the cleaning using the cleaning liquid according to the present invention. Examples of an alkaline agent included in the aqueous alkaline solution are the same as the above-described alkaline agents included in the cleaning liquid according to the present invention. The pH of the aqueous alkaline solution is preferably 10 or more and is particularly preferably 11 to 13 in consideration of the cleaning effect and ease of handling.

Cleaning using an aqueous acidic solution, which is effective for the removal of scale and metal colloid particles, may optionally be performed. For performing cleaning using an aqueous acidic solution, an aqueous solution that includes one or more acids selected from hydrochloric acid, nitric acid, citric acid, oxalic acid, and the like may be used. The pH of the aqueous acidic solution is preferably 4 or less and is particularly preferably 1 to 3 in consideration of the cleaning effect and ease of handling.

The amount of time during which immersion cleaning using the cleaning liquid according to the present invention or the other cleaning liquid is performed is not limited and may be set such that the properties of a membrane are recovered to a desired degree. Immersion cleaning is commonly performed for about 2 to 24 hours.

In the case where the cleaning using the cleaning liquid according to the present invention and the cleaning using the aqueous alkaline solution and/or the aqueous acidic solution are performed in a combined manner, the order in which the cleaning steps are conducted is not limited. Using the aqueous acidic solution prior to the cleaning using the cleaning liquid according to the present invention enables efficient removal of scale components.

Subsequent to the cleaning using the above cleaning liquids, commonly, high-purity water such as pure water is passed through a membrane in order to perform finish-cleaning. Subsequently, the operation of an RO membrane system is restarted.

EXAMPLE

The present invention is described below further specifically with reference to Examples.

The following reagents were used in Tests I to V below. Sodium chloride, sodium metasilicate nonahydrate (for preparation of silica solution), hydrochloric acid, isopropyl alcohol (IPA), urea, biuret, and sodium hydroxide were obtained from Wako Pure Chemical Industries, Ltd. Sodium hypochlorite (available chlorine concentration: 10%) was obtained from Sigma-Aldrich Co. LLC.

Propylene glycol (PG), sodium dodecyl sulfate (SDS), gluconic acid, and triethanolamine (TEA) were obtained from Wako Pure Chemical Industries, Ltd.

In the tests described below, in the test in which a membrane was immersed in a cleaning liquid, it is preferable that the rejection rate does not decrease or the salt permeability does not increase and that an increase in the flux is limited. It is unfavorable that the flux increases after the immersion test has been conducted because the flux increases when the membrane is degraded by the cleaning liquid.

However, it is preferable that the flux of a fouled membrane increases after the membrane has been cleaned.

[Test I]

A test was conducted under the following conditions in order to determine the impacts of the number of times a membrane was immersed in a cleaning liquid on the rejection rate and the pure-water flux and an ability to clean a fouled membrane.

<RO Membrane>

(1) New membrane: Aromatic polyamide RO membrane "ES20" (produced by Nitto Denko Corporation), unused item (2) Fouled membrane: A membrane having a smaller flux than the new membrane which is prepared by passing an aqueous solution including a nonionic surfactant (200-mg/L aqueous solution of SemiClean KG (produced by Yokohama Oils & Fats Industry Co., Ltd.)) through the new membrane at 0.75 MPa for 3 days.

<Testing Apparatus and Calculation Formula>

The flat-membrane testing apparatus shown in FIG. 1 was used.

In the flat-membrane testing apparatus, RO-membrane feed is fed to a raw-water chamber 1A included in a closed container 1 with a high-pressure pump 4 through a pipe 11. The raw-water chamber 1A is located below an RO membrane cell 2 including an RO membrane. The inside of the raw-water chamber 1A, which is located below the RO membrane cell 2, is stirred by a stirrer 3 rotating a stirring bar 5. Water permeated through the RO membrane is passed to a permeate chamber 1B located above the RO membrane cell 2 and subsequently extracted through a pipe 12. The concentrate is extracted through a pipe 13. The pressure inside the closed container 1 is adjusted with a pressure gage 6 disposed on the feed pipe 11 and a pressure control valve 7 disposed on the concentrate-extraction pipe 13.

The flux and rejection rate of the RO membrane were calculated using the following formulae.

$$\text{Flux } [m/day] = \text{Flow Rate of Permeate } [m^3/day]/\text{Area of Membrane } [m^2] \times \text{Temperature Conversion Coefficient } [-]$$

$$\text{Rejection Rate } [\%] = \{1-(\text{Concentration of Permeate } [mg/L]/\text{Concentration of Concentrate } [mg/L])\} \times 100$$

<Test Procedure>

<Impacts of Number of Times Membrane was Immersed in Cleaning Liquid on Rejection Rate and Pure-Water Flux>

(1) The pure-water flux of the new membrane was measured. A reference solution for the measurement of rejection rate (aqueous solution containing 500 mg/L of sodium chloride, 20 mg/L of silica, and 15.7 mg/L of IPA, which was prepared by mixing sodium chloride, sodium metasilicate nonahydrate, and IPA with water) was passed through the membrane at 0.75 MPa and 25° C. Subsequently, the rejection rates at which sodium chloride (NaCl), silica, and IPA were rejected by the membrane were measured.

(2) The membrane used in (1) was immersed in a cleaning liquid for 15 hours and then flushed with pure water for 2 hours. Subsequently, the pure-water flux of the membrane and the rejection rates at which sodium chloride (NaCl), silica, and IPA were rejected by the membrane were measured using the rejection-rate-measuring reference solution.

(3) A cycle of immersing the membrane in the cleaning liquid for 15 hours and subsequently flushing the membrane with pure water for 2 hours as in (1) was repeated. The pure-water flux of the membrane and the rejection rates at which sodium chloride (NaCl), silica, and IPA were rejected by the membrane were measured using the rejection rate-measuring reference solution after the fourth, eighth, and twelfth cycles of immersion and flushing (an accelerated test simulating multiple cleanings was conducted by repeatedly immersing the membrane in the cleaning liquid).

<Ability to Clean Fouled Membrane>

The pure-water flux of the new membrane was measured. A fouled membrane was prepared by the above-described method. The pure-water flux of the fouled membrane was measured. Subsequently, the fouled membrane was immersed in a cleaning liquid for 15 hours and subsequently flushed with pure water for 2 hours. The pure-water flux of the cleaned membrane was measured.

Hereinafter, the pure-water flux of the new membrane is referred to as "pure-water flux before fouling", the pure-water flux of the fouled membrane is referred to as "pure-water flux after fouling", and the pure-water flux of the cleaned membrane is referred to as "pure-water flux after cleaning".

Comparative Example I-1

The above-described test was conducted using an aqueous sodium hydroxide solution having a pH of 12 as a cleaning liquid.

Example I-1

A 0.8-weight % aqueous sodium hydroxide solution containing 40% by weight of urea was prepared and used as a cleaning agent. This cleaning agent was diluted to 5% by weight (20 times) with pure water to form an aqueous sodium hydroxide solution containing 2% by weight of urea and having a pH of 12. The above test was conducted using this cleaning liquid.

Example 1-2

The above test was conducted using, as a cleaning liquid, an aqueous sodium hydroxide solution containing 2% by weight of biuret and having a pH of 12.

<Results>

Tables 1a to 1c show the results of the test <Impacts of Number of Times Membrane Was Immersed in Cleaning Liquid on Rejection Rate and Pure-Water Flux> conducted in Comparative example I-1, Example I-1, and Example 1-2, respectively. Table 2 shows the results of the test <Ability to Clean Fouled Membrane>.

[Table 1]

TABLE 1a

<Comparative example I-1
(Cleaning liquid: pH12 Sodium hydroxide aqueous solution>

| Number of immersion times [times] | NaCl rejection rate [%] | IPA rejection rate [%] | Silica rejection rate [%] | Pure wate flux [m/day] |
|---|---|---|---|---|
| 0 | 99.1 | 82.9 | 98.4 | 1.50 |
| 1 | 99.0 | 74.8 | 97.9 | 1.74 |
| 4 | 98.9 | 69.5 | 97.4 | 1.90 |

TABLE 1a-continued

<Comparative example I-1
(Cleaning liquid: pH12 Sodium hydroxide aqueous solution>

| Number of immersion times [times] | NaCl rejection rate [%] | IPA rejection rate [%] | Silica rejection rate [%] | Pure wate flux [m/day] |
|---|---|---|---|---|
| 8 | 98.8 | 65.8 | 97.3 | 1.97 |
| 12 | 98.7 | 64.8 | 97.1 | 2.01 |

TABLE 1b

<Example I-1 (Cleaning liquid: pH12 2 wt % urea aqueous solution>

| Number of immersion times [times] | NaCl rejection rate [%] | IPA rejection rate [%] | Silica rejection rate [%] | Pure wate flux [m/day] |
|---|---|---|---|---|
| 0 | 98.5 | 80.7 | 97.9 | 1.50 |
| 1 | 98.5 | 84.8 | 98.1 | 1.33 |
| 4 | 98.6 | 85.1 | 97.8 | 1.39 |
| 8 | 98.7 | 86.7 | 98.3 | 1.28 |
| 12 | 98.4 | 84.2 | 97.9 | 1.43 |

TABLE 1c

<Example I-2 (Cleaning liquid: pH12 2 wt % biuret aqueous solution)>

| Number of immersion times [times] | NaCl rejection rate [%] | IPA rejection rate [%] | Silica rejection rate [%] | Pure wate flux [m/day] |
|---|---|---|---|---|
| 0 | 99.0 | 82.8 | 98.2 | 1.54 |
| 1 | 98.7 | 75.6 | 97.8 | 1.72 |
| 4 | 98.6 | 73.5 | 97.4 | 1.67 |
| 8 | 98.5 | 73.6 | 97.2 | 1.61 |
| 12 | 98.5 | 72.9 | 97.1 | 1.50 |

TABLE 2

| | Pure wate flux [m/day] | | |
|---|---|---|---|
| | Before fouling | After fouling | After cleaning |
| Comparative example I-1 | 1.50 | 0.66 | 1.15 |
| Example I-1 | 1.50 | 0.64 | 1.11 |
| Example I-2 | 1.54 | 0.65 | 1.22 |

<Discussion>

As is clear from the results shown in Table 1, while the NaCl, IPA, and silica rejection rates were reduced and the pure-water flux was increased in Comparative example I-1, the rejection rates were not reduced and the pure-water flux was substantially consistent in Example I-1. In Example 1-2, although the NaCl and silica rejection rates were substantially equal to those measured in Comparative example I-1, the IPA rejection rate was relatively high and the pure-water flux was consistent.

The results shown in Table 2 confirm that the ability to clean the fouled membrane measured in Example I-1 was substantially equal to that measured in Comparative example I-1 and that the cleaning effect achieved in Example 1-2 was larger than that achieved in Comparative example I-1.

[Test II]

A test was conducted under the following conditions in order to determine the impacts of immersing a membrane in a cleaning liquid on the rejection rate and the pure-water flux and an ability to clean a fouled membrane.

<RO Membrane>

(1) New membrane: Aromatic polyamide RO membrane "ES20" (produced by Nitto Denko Corporation), unused item (2) Fouled membrane: A membrane having a smaller flux than the new membrane which is prepared by passing an aqueous solution including a nonionic surfactant (200-mg/L aqueous solution of SemiClean KG (produced by Yokohama Oils & Fats Industry Co., Ltd.)) through the new membrane at 0.75 MPa and 25° C. for 3 days.

<Combined Chlorine Cleaning Agent>

A cleaning agent containing 0.85 M of monochlorosulfamic acid, which is a combined chlorine compound, was prepared by mixing sulfamic acid, an aqueous sodium hypochlorite solution (available chlorine: 12 weight %), sodium hydroxide, and water in the proportions of 18:50:11:21 by weight ($Cl_2$/N molar ratio: 0.46).

<Testing Apparatus and Calculation Formula>

As in Test I

<Test Procedure>

<Impacts of Immersing Membrane in Cleaning Liquid on Rejection Rate and Pure-Water Flux>

(1) The pure-water flux of the new membrane was measured. A reference solution for the measurement of rejection rate (aqueous solution containing 500 mg/L of sodium chloride and 15.7 mg/L of IPA, which was prepared by mixing sodium chloride and IPA with water) was passed through the membrane at 0.75 MPa and 25° C. Subsequently, the rejection rates at which sodium chloride (NaCl) and IPA were rejected by the membrane were measured.

(2) The membrane used in (1) was immersed in a cleaning liquid for 15 hours and then flushed with pure water for 2 hours. Subsequently, the pure-water flux of the membrane and the rejection rates at which sodium chloride (NaCl) and IPA were rejected by the membrane were measured using the rejection-rate-measuring reference solution.

<Ability to Clean Fouled Membrane>

The pure-water flux of the new membrane was measured. A fouled membrane was prepared by the above-described method. The pure-water flux of the fouled membrane was measured. Subsequently, the fouled membrane was immersed in a cleaning liquid for 15 hours and then flushed with pure water for 2 hours. The pure-water flux of the cleaned membrane was measured.

Hereinafter, the pure-water flux of the new membrane is referred to as "pure-water flux before fouling", the pure-water flux of the fouled membrane is referred to as "pure-water flux after fouling", and the pure-water flux of the cleaned membrane is referred to as "pure-water flux after cleaning".

Comparative Example II-1

The above-described test was conducted using, as a cleaning liquid, water whose pH had been adjusted to be 6.5 by the addition of hydrochloric acid and sodium hydroxide.

Comparative Example 11-2

The above-described test was conducted using, as a cleaning liquid, an aqueous solution whose pH had been adjusted to be 6.5 by the addition of hydrochloric acid, the aqueous solution containing 2% by weight of a combined chlorine cleaning agent.

Example II-1

The above-described test was conducted using, as a cleaning liquid, an aqueous solution whose pH had been adjusted to be 6.5 by the addition of hydrochloric acid, the aqueous solution containing 2% by weight of a combined chlorine cleaning agent and 2% by weight of urea.

<Results>

Tables 3a to 3c show the results of the test <Impacts of Immersing Membrane in Cleaning Liquid on Rejection Rate and Pure-Water Flux> conducted in Comparative example II-1, Comparative example 11-2, and Example II-1, respectively. Table 4 shows the results of the test <Ability to Clean Fouled Membrane>.

[Table 3]

TABLE 3a

<Comparative example II-1 (Cleaning liquid: pH6.5 Water)>

| Immersion | NaCl rejection rate [%] | IPA rejection rate [%] | Pure wate flux [m/day] |
|---|---|---|---|
| Before | 99.1 | 84.7 | 1.54 |
| After | 99.1 | 84.7 | 1.54 |

TABLE 3b

<Comparative example II-1 (Cleaning liquid: pH6.5 2 wt % combined chlorine aqueous solution>

| Immersion | NaCl rejection rate [%] | IPA rejection rate [%] | Pure wate flux [m/day] |
|---|---|---|---|
| Before | 99.1 | 84.8 | 1.54 |
| After | 99.1 | 83.5 | 1.58 |

TABLE 3c

<Example II-1 (Cleaning liquid: pH6.5 2 wt % combined chlorine aqueous solution, 2 wt % urea aqueous solution)>

| Immersion | NaCl rejection rate [%] | IPA rejection rate [%] | Pure wate flux [m/day] |
|---|---|---|---|
| Before | 99.1 | 84.7 | 1.54 |
| After | 99.1 | 86.5 | 1.50 |

TABLE 4

| | Pure wate flux [m/day] | | |
|---|---|---|---|
| | Before fouling | After fouling | After cleaning |
| Comparative example II-1 | 1.54 | 0.67 | 0.69 |
| Comparative example II-2 | 1.54 | 0.67 | 0.81 |
| Example II-1 | 1.54 | 0.67 | 0.80 |

<Discussion>

As is clear from the results shown in Table 3, in Comparative example 11-2, the IPA rejection rate was slightly lower and the pure-water flux was slightly larger than those measured in Comparative example II-1. In Example II-1, the IPA rejection rate was not reduced and the pure-water flux was slightly reduced.

As is clear from the results shown in Table 4, the cleaning effect achieved in Example II-1 was comparable to that achieved in Comparative example 11-2.

[Test III]

A test was conducted under the following conditions in order to determine the impacts of immersing a membrane in a cleaning liquid on the rejection rate and the pure-water flux.

<RO Membrane>

(1) New membrane: Aromatic polyamide RO membrane "ES20" (produced by Nitto Denko Corporation), unused item <Testing Apparatus and Calculation Formula>

As in Test I

Example III-1

The pure-water flux of the new membrane was measured. A reference solution for the measurement of rejection rate (aqueous solution containing 500 mg/L of sodium chloride and 15.7 mg/L of IPA) was passed through the membrane at 0.75 MPa and 25° C. as in Test II. Subsequently, the rejection rates at which sodium chloride (NaCl) and IPA were rejected by the membrane were measured.

An aqueous sodium hydroxide solution having a pH of 12 and containing 0.5% by weight of urea was used as a cleaning liquid. The membrane was immersed in the cleaning liquid for 15 hours and then flushed with pure water for 2 hours. Subsequently, the pure-water flux of the membrane and the rejection rates at which sodium chloride (NaCl) and IPA were rejected by the membrane were measured using the rejection-rate-measuring reference solution.

<Results>

Table 5 shows the results.

TABLE 5

<Example III-1 (Cleaning liquid: pH12 0.5 wt % urea aqueous solution)>

| Immersion | NaCl rejection rate [%] | IPA rejection rate [%] | Pure wate flux [m/day] |
| --- | --- | --- | --- |
| Before | 99.0 | 82.3 | 1.41 |
| After | 98.9 | 81.2 | 1.43 |

<Discussion>

The results obtained in Example III-1 confirm that the reduction in the IPA rejection rate and the increase in the pure-water flux were limited compared with those measured after the first cycle of immersion in Comparative example I-1 (Test I), where an aqueous sodium hydroxide solution having a pH of 12 was used as a cleaning liquid.

[Test IV]

A test was conducted under the following conditions in order to determine the impacts of immersing a membrane in a cleaning liquid on the rejection rate and the pure-water flux and an ability to clean a fouled membrane.

<RO Membrane>

(1) New membrane: Aromatic polyamide RO membrane "ES20" (produced by Nitto Denko Corporation), unused item (2) Fouled membrane: A membrane having a smaller flux than the new membrane which is prepared by passing an aqueous solution including a nonionic surfactant (200-mg/L aqueous solution of SemiClean KG (produced by Yokohama Oils & Fats Industry Co., Ltd.)) through the new membrane at 0.75 MPa and 25° C. for 3 days.

<Testing Apparatus and Calculation Formula>

As in Test I

<Test Conditions>

<Impacts of Immersing Membrane in Cleaning Liquid on Rejection Rate and Pure-Water Flux>

(1) The pure-water flux of the new membrane was measured. A reference solution for the measurement of rejection rate (aqueous solution containing 500 mg/L of sodium chloride and 15.7 mg/L of IPA) was passed through the membrane at 0.75 MPa and 25° C. as in Test II. Subsequently, the rejection rates at which sodium chloride (NaCl) and IPA were rejected by the membrane were measured.

(2) The membrane used in (1) was immersed in a cleaning liquid for 15 hours and then flushed with pure water for 2 hours. Subsequently, the pure-water flux of the membrane and the rejection rates at which sodium chloride (NaCl) and IPA were rejected by the membrane were measured using the rejection rate-measuring reference solution.

<Ability to Clean Fouled Membrane>

The pure-water flux of the new membrane was measured. A fouled membrane was prepared by the above-described method. The pure-water flux of the fouled membrane was measured. Subsequently, the fouled membrane was immersed in a cleaning liquid for 15 hours and then flushed with pure water for 2 hours. The pure-water flux of the cleaned membrane was measured.

Hereinafter, the pure-water flux of the new membrane is referred to as "pure-water flux before fouling", the pure-water flux of the fouled membrane is referred to as "pure-water flux after fouling", and the pure-water flux of the cleaned membrane is referred to as "pure-water flux after cleaning".

Comparative Example IV-1

The above-described test was conducted using, as a cleaning liquid, an aqueous sodium hydroxide solution having a pH of 13.

Example IV-1

The above-described test was conducted using, as a cleaning liquid, an aqueous sodium hydroxide solution having a pH of 13 and containing 2% by weight of urea.

<Results>

Tables 6a and 6b show the results of the test <Impacts of Immersing Membrane in Cleaning Liquid on Rejection Rate and Pure-Water Flux> conducted in Comparative example IV-1 and Example IV-1, respectively. Table 7 shows the results of the test <Ability to Clean Fouled Membrane>.

[Table 6]

TABLE 6a

<Comparative exampleIV-1
(Cleaning liquid: pH13 Sodium hydroxide aqueous solution)>

| Immersion | NaCl rejection rate [%] | IPA rejection rate [%] | Pure wate flux [m/day] |
|---|---|---|---|
| Before | 98.9 | 80.5 | 1.58 |
| After | 98.4 | 66.4 | 2.03 |

TABLE 6b

<ExampleIV-1 (Cleaning liquid: pH13 2 wt % urea aqueous solution)>

| Immersion | NaCl rejection rate [%] | IPA rejection rate [%] | Pure wate flux [m/day] |
|---|---|---|---|
| Before | 98.7 | 81.0 | 1.54 |
| After | 98.5 | 70.6 | 1.92 |

TABLE 7

| | Pure wate flux [m/day] | | |
|---|---|---|---|
| | Before fouling | After fouling | After cleaning |
| Comparative example IV-1 | 1.58 | 0.66 | 1.36 |
| Example IV-1 | 1.54 | 0.65 | 1.33 |

<Discussion>

The results shown in Table 6 confirm that, in Example IV-1, the reduction in the IPA rejection rate and the increase in the pure-water flux were limited compared with those measured in Comparative example IV-1.

The results shown in Table 7 confirm that, in Comparative example IV-1 and Example IV-1, setting the pH to 13 increased the cleaning effect compared with that achieved in Comparative example I-1 (Test I).

[Test V]

A test was conducted under the following conditions in order to determine the changes in the salt permeability and the flux of a membrane which were caused by immersing the membrane in a cleaning liquid.

<RO Membrane>

(1) New membrane: Aromatic polyamide RO membrane for seawater desalination "TM-810-V" (produced by Toray Industries, Inc.), unused item <Testing Apparatus and Calculation Formula>

The testing apparatus used was a flat-membrane testing machine SEPA CF2 unit (produced by GE Energy Japan, Ltd.).

Salt permeability and flux were calculated using the following formulae.

$$\text{Salt Permeability [\%]} = \frac{\text{Salt Concentration in Permeate[mg/L]} \times 2}{\text{Salt Concentration in Feed [mg/L]} + \text{Salt Concentration in Concentrate [mg/L]}} \times 100$$

$$\text{Flux [m/day]} = \frac{\text{Flow Rate of Permeate [m/day]}}{\text{Area of Membrane [m}^2\text{]}} \times \text{Temperature Conversion Factor [-]}$$

<Test Procedure>

(1) A reference solution for the measurement of rejection rate (aqueous solution containing 32000 mg/L of sodium chloride, pH: 8) for seawater desalination was passed through the new membrane at 5.5 MPa and 25° C. Subsequently, the percentage at which sodium chloride was permeated through the membrane (salt permeability) and the flux was measured.

(2) The membrane used in (1) was immersed in a cleaning liquid for 150 hours and then immersed in pure water for 24 hours. Subsequently, the salt permeability and the flux of the membrane were measured using the rejection-rate-measuring reference solution for seawater desalination (an accelerated test simulating multiple cleanings was conducted by immersing the membrane in the cleaning liquid for the prolonged period of time).

Comparative Example V-1

The above-described test was conducted using, as a cleaning liquid, an aqueous sodium hydroxide solution having a pH of 12.

Example V-1

The above-described test was conducted using, as a cleaning liquid, an aqueous sodium hydroxide solution containing 1% by weight of urea and having a pH of 12.

Comparative Example V-2

The above-described test was conducted using, as a cleaning liquid, an aqueous sodium hydroxide solution having a pH of 12 and containing 2% by weight of propylene glycol (PG), 0.15% by weight of sodium dodecyl sulfate (SDS), and 0.5% by weight of gluconic acid.

Example V-2

The above-described test was conducted using, as a cleaning liquid, an aqueous sodium hydroxide solution having a pH of 12 and containing 2% by weight of PG, 0.15% by weight of SDS, 0.5% by weight of gluconic acid, and 0.5% by weight of urea.

Example V-3

The above-described test was conducted using, as a cleaning liquid, an aqueous sodium hydroxide solution having a pH of 12 and containing 2% by weight of triethanolamine (TEA), 0.15% by weight of SDS, 0.5% by weight of gluconic acid, and 0.5% by weight of urea.

Example V-4

The above-described test was conducted using, as a cleaning liquid, an aqueous sodium hydroxide solution having a pH of 12 and containing 2% by weight of TEA, 0.15% by weight of SDS, 0.5% by weight of gluconic acid, and 1% by weight of urea.

<Results>

Figure 2:
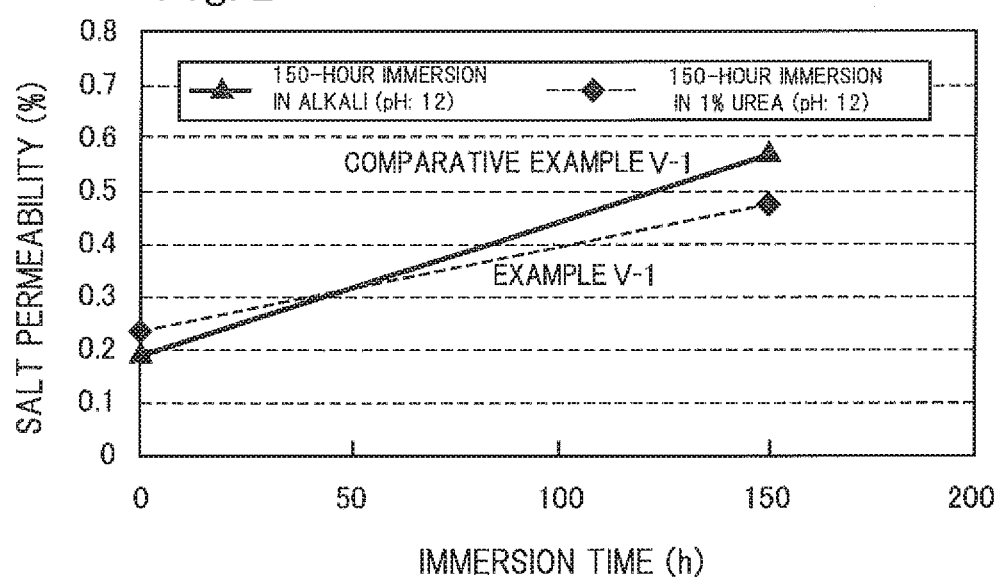
FIG. 2 is a graph illustrating the results of the measurement of salt permeability conducted in Comparative example V-1 and Example V-1.
Figure 3:
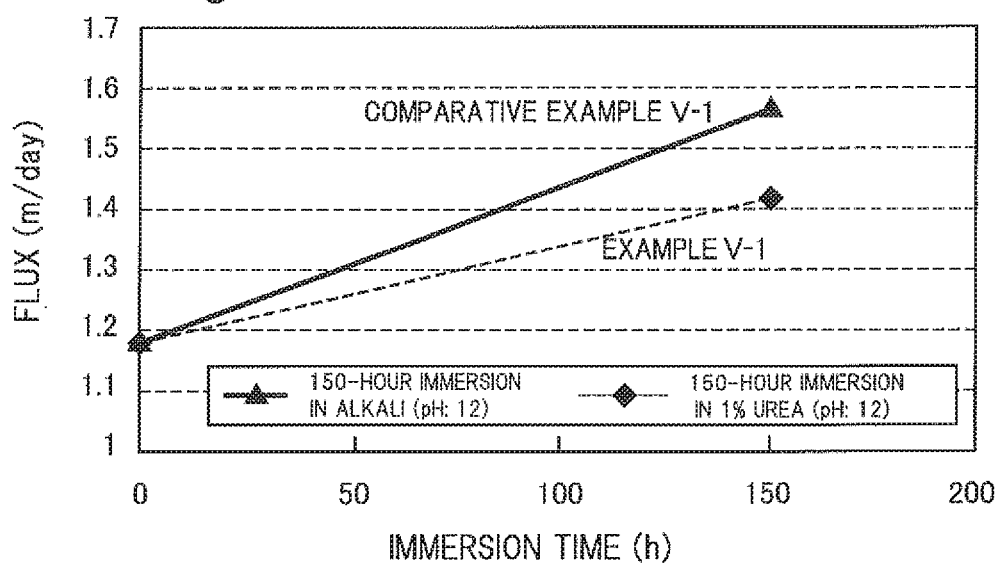
FIG. 3 is a graph illustrating the results of the measurement of flux conducted in Comparative example V-1 and Example V-1.
Figure 4:
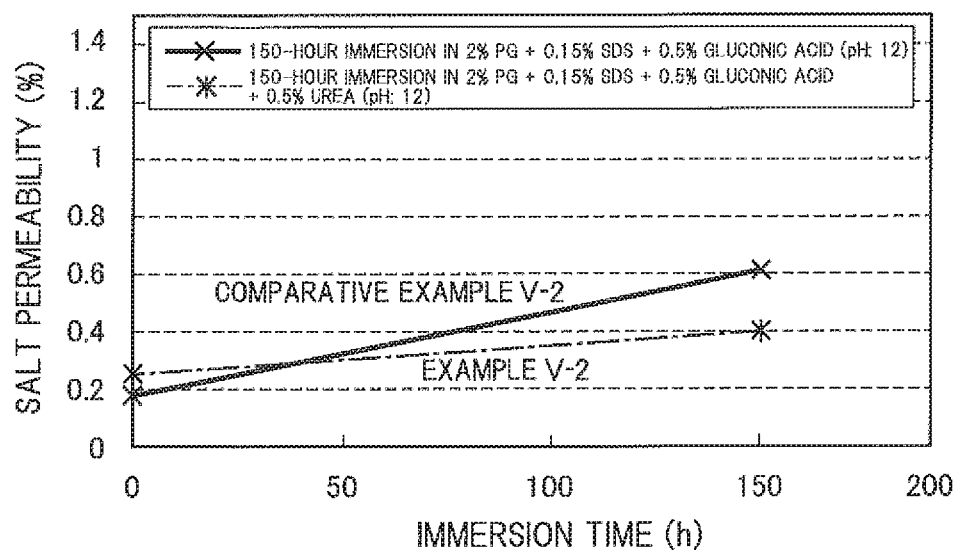
FIG. 4 is a graph illustrating the results of the measurement of salt permeability conducted in Comparative example V-2 and Example V-2.
Figure 5:
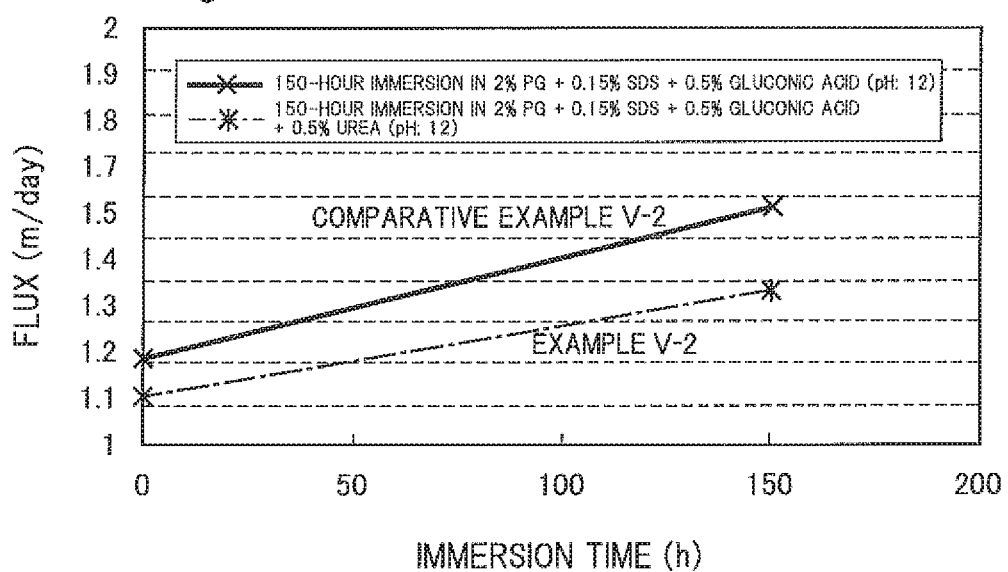
FIG. 5 is a graph illustrating the results of the measurement of flux conducted in Comparative example V-2 and Example V-2.
Figure 6:
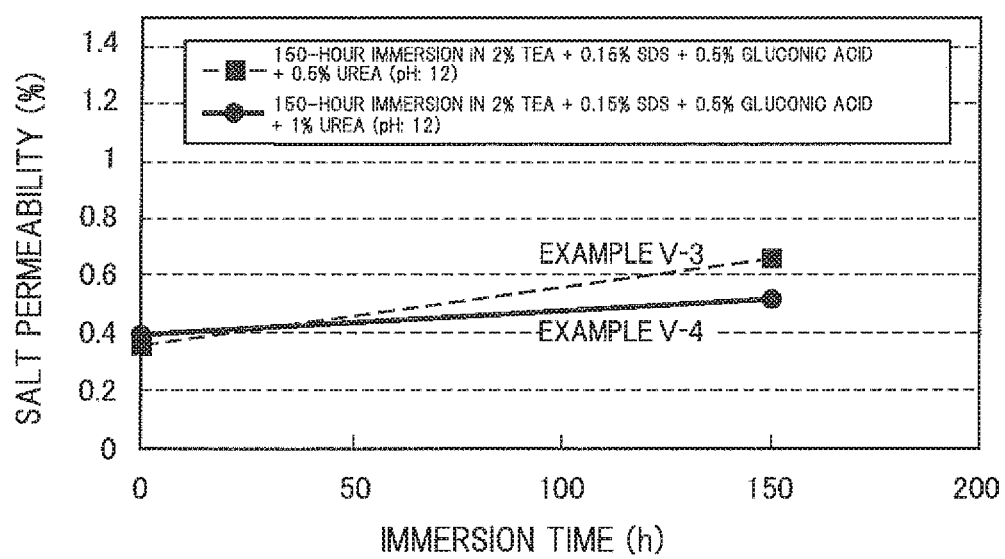
FIG. 6 is a graph illustrating the results of the measurement of salt permeability conducted in Examples V-3 and V-4.

FIGS. 2 and 3 show the results of the measurement of salt permeability and flux conducted in Comparative example V-1 and Example V-1. FIGS. 4 and 5 show the results of the measurement of salt permeability and flux conducted in Comparative example V-2 and Example V-2. FIGS. 6 and 7 show the results of the measurement of salt permeability and flux conducted in Examples V-3 and V-4.

<Discussion>

The results shown in FIGS. 2 and 3 confirm that, in Example V-1, where the cleaning liquid contained 1% by weight of urea, the increases in salt permeability and flux were limited. It is considered that, when a membrane is damaged from an aqueous alkaline solution, the denseness of the membrane is degraded and, as a result, the rejection property of the membrane is degraded and the flux of the membrane is increased. It is considered that adding urea to the cleaning liquid reduced the damage to the membrane.

The results shown in FIGS. 4 and 5 confirm that, in Example V-2, where the cleaning liquid contained 0.5% by weight of urea, the increase in salt permeability was limited, that is, the damage to the membrane was reduced. The slope of the increase in flux was smaller in Example V-2 than in Comparative example V-2.

The results shown in FIGS. 6 and 7 confirm that, in Example V-4, where the cleaning liquid contained 1% by weight of urea, the increases in salt permeability and flux were limited, that is, the damage to the membrane was reduced, compared with Example V-3, where the concentration of urea was 0.5% by weight.

Although the present invention has been described in detail with reference to particular embodiments, it is apparent to a person skilled in the art that various modifications can be made therein without departing from the spirit and scope of the present invention.

The present application is based on Japanese Patent Application No. 2014-205704 filed on Oct. 6, 2014, which is incorporated herein by reference in its entirety.

REFERENCE SIGNS LIST

1 CONTAINER
RO MEMBRANE CELL
STIRRER
4 HIGH-PRESSURE PUMP
5 STIRRING BAR
6 PRESSURE GAGE
7 PRESSURE CONTROL VALVE

The invention claimed is:

1. A method for cleaning a polyamide reverse osmosis membrane, said method comprising the step of bringing the polyamide reverse osmosis membrane into contact with a liquid comprising:
   a) a source of alkalinity sufficient to act as a cleaning agent for the polyamide reverse osmosis membrane, and maintain a pH of the liquid between 11 and 14; and
   b) a diluted aqueous solution containing urea and/or biuret, wherein the urea and/or biuret serves to protect the polyamide reverse osmosis membrane from the cleaning agent by adsorbing the urea and/or the biuret onto amide bonds on the polyamide reverse osmosis membrane, thereby preventing the amide bonds from being broken by the liquid.

2. The method for cleaning a polyamide reverse osmosis membrane according to claim 1, wherein the polyamide reverse osmosis membrane is an aromatic polyamide reverse osmosis membrane.

3. The method for cleaning a polyamide reverse osmosis membrane according to claim 1, wherein a concentration of the urea and/or the biuret is 0.01% to 10% by weight.

4. The method for cleaning a polyamide reverse osmosis membrane according to claim 1, wherein the polyamide reverse osmosis membrane is brought into contact with the liquid for 2-24 hours.

5. The method for cleaning a polyamide reverse osmosis membrane according to claim 1, further comprising cleaning the polyamide reverse osmosis membrane by an aqueous alkaline solution and/or aqueous acidic solution before or after using said liquid.

* * * * *